United States Patent
Mukherjee et al.

(10) Patent No.: US 12,417,615 B2
(45) Date of Patent: Sep. 16, 2025

(54) SYSTEM AND METHOD FOR CONSOLIDATION OF ALERTS AND EVENTS USING IMAGE MATCHING OF HEATMAP DESCRIPTIONS OF INFRASTRUCTURE STATUS

(71) Applicant: Bank of America Corporation, Charlotte, NC (US)

(72) Inventors: Maharaj Mukherjee, Poughkeepsie, NY (US); Utkarsh Raj, Charlotte, NC (US); Colin Murphy, Charlotte, NC (US); Carl Benda, Charlotte, NC (US); Elvis Nyamwange, Little Elm, TX (US); Vijay Kumar Yarabolu, Hyderabad (IN); Suman Roy Choudhury, Jersey City, NJ (US)

(73) Assignee: Bank of America Corporation, Charlotte, NC (US)

(*) Notice: Subject to any disclaimer, the term of this patent is extended or adjusted under 35 U.S.C. 154(b) by 322 days.

(21) Appl. No.: 18/197,924

(22) Filed: May 16, 2023

(65) Prior Publication Data
US 2024/0386696 A1    Nov. 21, 2024

(51) Int. Cl.
*G06K 9/00* (2022.01)
*G06V 10/74* (2022.01)
(Continued)

(52) U.S. Cl.
CPC ............ *G06V 10/761* (2022.01); *G06V 10/82* (2022.01); *G08B 21/00* (2013.01)

(58) Field of Classification Search
None
See application file for complete search history.

(56) References Cited

U.S. PATENT DOCUMENTS

| | | |
|---|---|---|
| 11,625,293 B1 | 4/2023 | Ratkovic et al. |
| 2014/0278496 A1 | 9/2014 | Spencer |

(Continued)

FOREIGN PATENT DOCUMENTS

| | | |
|---|---|---|
| SG | 10201610116 P | 6/2018 |

OTHER PUBLICATIONS

Dec. 27, 2024—(US) Office Action—U.S. Appl. No. 18/198,367.
(Continued)

*Primary Examiner* — Sj Park
(74) *Attorney, Agent, or Firm* — Banner & Witcoff, Ltd.

(57) ABSTRACT

A computing platform may train, using historical telemetry state images, an image comparison model to identify matches between telemetry state images. The computing platform may generate a plurality of system alerts corresponding to a period of time. The computing platform may access telemetry data corresponding to the period of time. The computing platform may generate, based on the telemetry data and for a time corresponding to each of the plurality of system alerts, a telemetry state image. The computing platform may input, into the image comparison model, the telemetry state images to identify whether or not any of the plurality of telemetry state images match. Based on detecting a match, the computing platform may consolidate system alerts corresponding to the matching telemetry state images, which may produce a single system alert and may send, to a user device, the single system alert.

20 Claims, 8 Drawing Sheets

(51) Int. Cl.
  *G06V 10/82*   (2022.01)
  *G08B 21/00*   (2006.01)

(56) References Cited

U.S. PATENT DOCUMENTS

| | | |
|---|---|---|
| 2014/0310564 A1 | 10/2014 | Mallige et al. |
| 2015/0149134 A1 | 5/2015 | Mehta et al. |
| 2016/0041948 A1 | 2/2016 | Vichare et al. |
| 2016/0155315 A1* | 6/2016 | McElhinney ............ G06N 5/02 340/502 |
| 2016/0266962 A1 | 9/2016 | Rajasekharan et al. |
| 2018/0157963 A1 | 6/2018 | Salti et al. |
| 2019/0139441 A1 | 5/2019 | Akella et al. |
| 2019/0179723 A1 | 6/2019 | Allin et al. |
| 2019/0199602 A1 | 6/2019 | Zhang et al. |
| 2020/0125465 A1 | 4/2020 | Choi et al. |
| 2020/0201697 A1 | 6/2020 | Torng et al. |
| 2020/0295986 A1 | 9/2020 | Rathinasabapathy et al. |
| 2021/0056678 A1 | 2/2021 | Al Shehri et al. |
| 2022/0246657 A1 | 8/2022 | Lin et al. |
| 2022/0269035 A1 | 8/2022 | Kimura et al. |
| 2022/0271072 A1 | 8/2022 | Miyata |
| 2022/0295000 A1 | 9/2022 | Yamazaki et al. |
| 2022/0295006 A1 | 9/2022 | Kashiwagi |
| 2022/0310684 A1 | 9/2022 | Sakata et al. |
| 2022/0321791 A1 | 10/2022 | Lin et al. |
| 2022/0372181 A1 | 11/2022 | Iwata et al. |
| 2022/0392944 A1 | 12/2022 | Tochigi et al. |
| 2022/0399469 A1 | 12/2022 | Minari |
| 2022/0408046 A1 | 12/2022 | Katou et al. |
| 2022/0415947 A1 | 12/2022 | Hasegawa |
| 2022/0417464 A1 | 12/2022 | Tatsuzawa |
| 2023/0005981 A1 | 1/2023 | Ito et al. |
| 2023/0013149 A1 | 1/2023 | Akiyama |
| 2023/0014856 A1 | 1/2023 | Goto |
| 2023/0020741 A1 | 1/2023 | Liu et al. |
| 2023/0058009 A1 | 2/2023 | Tsuchimoto et al. |
| 2023/0073737 A1 | 3/2023 | Li et al. |
| 2023/0110102 A1 | 4/2023 | Li et al. |

OTHER PUBLICATIONS

Di Liu et al. "An Improved Dynamic Load-balancing Model" IEEE (Year 2016).
Javier Lopez et al. "A Resilient Architecture for the Smart Grid" IEEE (Year 2018).
Emre Gures "Machine Learning-Based Load Balancing Algorithms in Future Heterogeneous Networks: A Survey" IEEE (Year 2022).
Li Liu et al. "Machine Learning-Based Load Balancing Algorithms in Future Heterogeneous Networks: A Survey" IEEE (Year 2007).
Areeg Samir et al. "A Controller Architecture for Anomaly Detection, Root Cause Analysis and Self-Adaptation for Cluster Architectures" Year 2019.
Qing Wang et al. "Constructing the Knowledge Base for Cognitive IT Service Manaement" (Year 2017).
Jan. 2, 2025—(US) Notice of Allowance—U.S. Appl. No. 18/201,817.
Li Liu et al. "Fault Detection, Diagnostics, and Prognostics: Software Agent Solutions" IEEE Transactions on Vehicular Technology, vol. 56, No. 4 (Year Jul. 2007).
Apr. 8, 2025—(US) Notice of Allowance—U.S. Appl. No. 18/201,817.
Apr. 11, 2025—(US) Office Action—U.S. Appl. No. 18/198,367.

* cited by examiner

SYSTEM AND METHOD FOR CONSOLIDATION OF ALERTS AND EVENTS USING IMAGE MATCHING OF HEATMAP DESCRIPTIONS OF INFRASTRUCTURE STATUS

BACKGROUND

In some instances, infrastructure and/or application monitoring tools may generate alerts for a number of reasons. Such tools often generate several alerts that may be related to the same incident or root cause. Because each alert may provoke investigation by a system engineer, it may create inefficiencies if multiple alerts related to the same incident or root cause are generated. Accordingly, it may be important to improve the methods of alert generation for such tools.

SUMMARY OF THE INVENTION

Aspects of the disclosure provide effective, efficient, scalable, and convenient technical solutions that address and overcome the technical problems associated with system alerts. In accordance with one or more embodiments of the disclosure, a computing platform comprising at least one processor, a communication interface, and memory storing computer-readable instructions may train, using historical telemetry state images, an image comparison model to identify matches between telemetry state images. The computing platform may generate, for a system, a plurality of system alerts corresponding to a period of time. The computing platform may access telemetry data corresponding to the period of time. The computing platform may generate, based on the telemetry data and for a time corresponding to each of the plurality of system alerts, a telemetry state image to produce a plurality of telemetry state images. The computing platform may input, into the image comparison model, the plurality of telemetry state images to identify whether or not any of the plurality of telemetry state images match. Based on detecting a match, the computing platform may: 1) consolidate system alerts corresponding to the matching telemetry state images, which may produce a single system alert representative of the system alerts corresponding to the matching telemetry state images, and 2) send, to a user device, the single system alert and one or more commands directing the user device to display the single system alert, which may cause the user device to display the single system alert.

In one or more instances, training the image comparison model may include training the image comparison model to perform a structural property comparison between telemetry state images to identify whether or not there is a match between the telemetry state images. In one or more instances, training the image comparison model may include training the image comparison model to perform pattern matching using a convolutional neural network (CNN) to identify whether or not there is a match between the telemetry state images.

In one or more examples, identifying whether or not any of the plurality of telemetry state images match may include: 1) identifying a matching score between at least two of the telemetry state images; 2) comparing the matching score to a matching threshold; 3) based on identifying that the matching score meets or exceeds the matching threshold, identifying that the at least two of the telemetry state images match; and 4) based on identifying that the matching score does not meet or exceed the matching threshold, identifying that the at least two of the telemetry state images do not match.

In one or more instances, based on failing to detect the match, the computing platform may send, to the user device, the plurality of system alerts and one or more commands directing the user device to display the plurality of system alerts, which may cause the user device to display the plurality of system alerts. In one or more instances, the computing platform may update, based on identifying whether or not any of the plurality of telemetry state images match, the image comparison model.

In one or more examples, based on detecting the match, the computing platform may send a single alert resolution command directing a network system to execute one or more alert resolution actions to address a system issue noted in the single system alert. In one or more examples, based on failing to detect the match, the computing platform may send a plurality of alert resolution commands directing a network system to execute one or more alert resolution actions to address system issues noted in each of the plurality of system alerts. In one or more examples, the computing platform may normalize the telemetry data, and generating the plurality of telemetry state images may include generating, using the normalized telemetry data, the plurality of telemetry state images.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to a system and method for consolidating alerts using image matching of heatmap descriptions of infrastructure status, as is described further below.

Technology infrastructure application monitoring tools as well as infrastructure monitoring tools may generate alerts for many reasons (e.g., when the devices and applications deteriorate in performance, when the device capacity such as CPU, memory, disk space, or the like get overly used or full, any significant diversion from the normal operating conditions, any device or hardware failures, and/or other reasons).

Whatever the reason might be, the system may generate several alerts that might be related to the same incident or root cause. Incident reports from an internal tool may show alerts and incidents that are most likely generated from the same root cause.

Since each alert may be investigated by a system engineer, it may create inefficiencies if several alerts are created from the same root cause. It may be, therefore, important to consolidate similar alerts together so that the engineers can focus on fewer items.

As described below, thermal images may be used that capture the overall health and capacity of the whole infrastructure system. The thermal image may be created by starting with a table of raw telemetry data. The data may be further normalized to convert each cell into a value between zero and one in floating point numbers. The resulting matrix may be a normalized image. Examples of this normalized image can be displayed by appropriate thresholding and associating a color with each of the threshold ranges.

These normalized images may represent the overall health of the system and can be directly attributed and linked to any events, incidents, and consequently any alerts generated. An image matching program may be used to check if the normalized images associated with two alerts are similar. If they are, the alerts may be categorized as the same.

Image similarity matching may be performed for alerts generated around the same time to categorize them as the same alert. All alerts in the same category may be consolidated and presented as one hyper-alert to the user.

The similarity determination of two featureless images may be performed by consecutive low pass filtering, structural similarity matching, and/or other techniques by using image properties such as average, peaks, troughs, center of gravity, moment, spatial frequency, or the like. These and other features are described in greater details below.

Figure 1A:
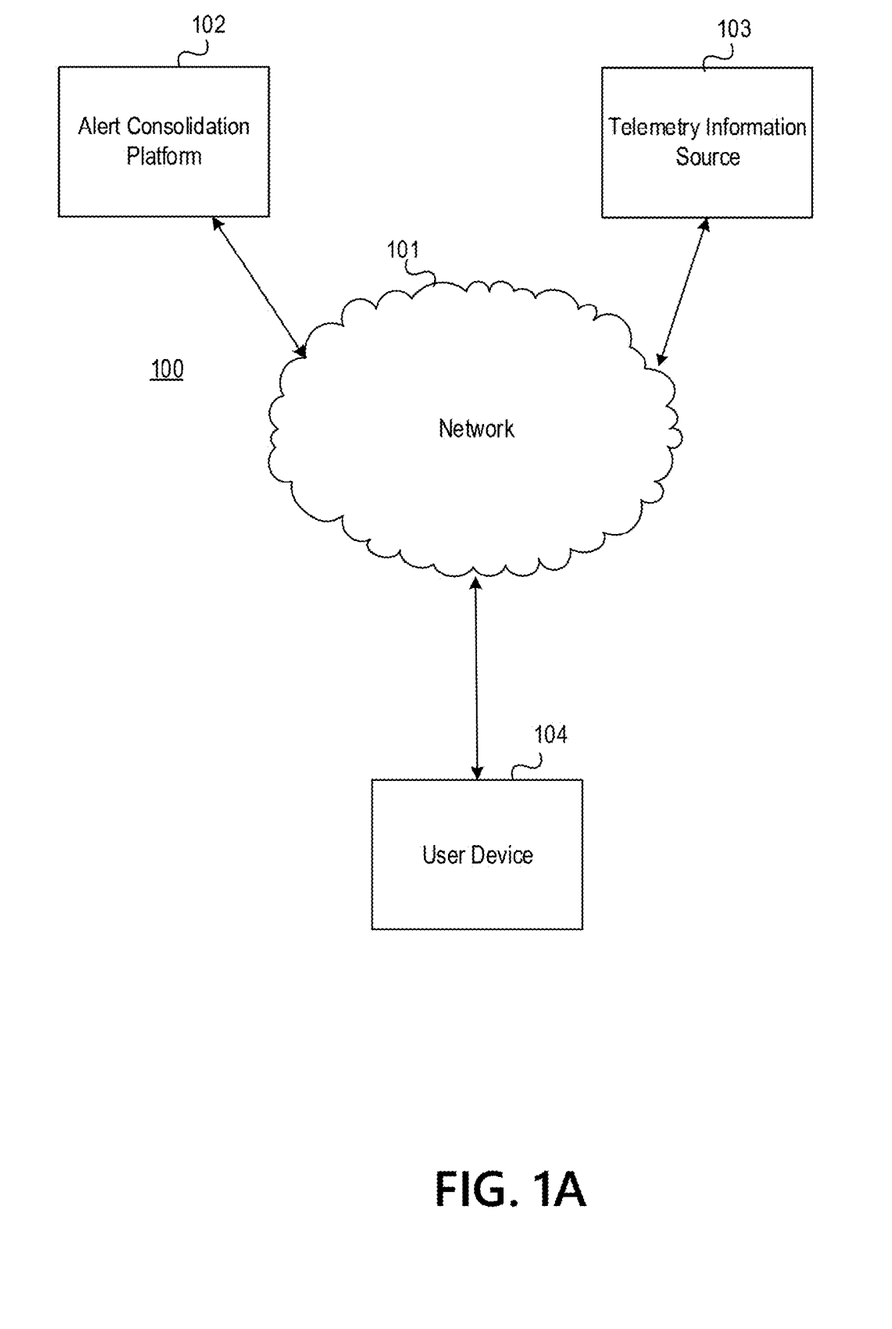
FIGS. 1A and 1B depict an illustrative computing environment for consolidating alerts using image matching of heatmap descriptions in accordance with one or more example embodiments.
Figure 1B:
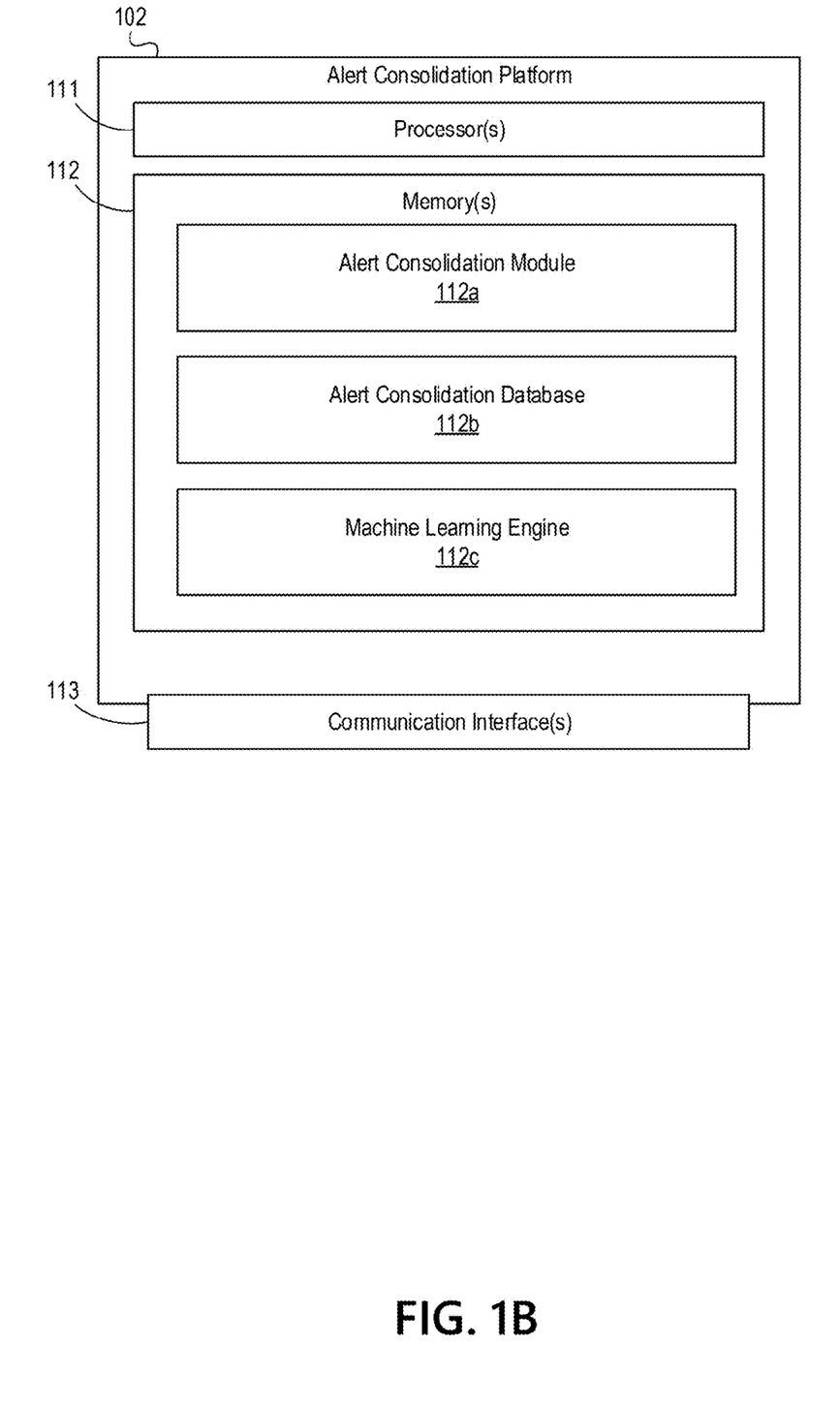

FIGS. 1A-1B depict an illustrative computing environment for consolidating alerts using image matching of heatmap descriptions in accordance with one or more example embodiments. Referring to FIG. 1A, computing environment 100 may include one or more computer systems. For example, computing environment 100 may include an alert consolidation platform 102, telemetry information source 103, and user device 104.

Alert consolidation platform 102 may include one or more computing devices and/or other computer components (e.g., processors, memories, communication interfaces, or the like). For example, the alert consolidation platform 102 may be configured to generate, update, and/or otherwise maintain an image comparison model configured to identify matches between state images. In some instances, the image comparison model may use structural similarities and/or constructive low pass filtering to compare the images. Based on the results of the image matching, the alert consolidation platform 102 may be configured to consolidate alerts corresponding to matching images.

Telemetry information source 103 may be or include one or more computing devices (e.g., servers, server blades, or the like) and/or other computer components (e.g., processors, memories, communication interfaces, and/or other components). In some instances, the telemetry information source 103 may be configured to monitor a plurality of individual systems to collect the corresponding telemetry data. In other instances, the telemetry information source 103 may be the source of the telemetry data itself (e.g., producing the telemetry data). Although a single telemetry information source 103 is shown, any number of telemetry information sources 103 may be included in the system architecture without departing from the scope of the disclosure.

User device 104 may be or include one or more devices (e.g., laptop computers, desktop computer, smartphones, tablets, and/or other devices) configured for use in receiving preemptive resolution information from the alert consolidation platform 102. In some instances, the user device 104 may be configured to display graphical user interfaces (e.g., system alerts, or the like). Any number of such user devices may be used to implement the techniques described herein without departing from the scope of the disclosure.

Computing environment 100 also may include one or more networks, which may interconnect alert consolidation platform 102, telemetry information source 103, and user device 104. For example, computing environment 100 may include a network 101 (which may interconnect, e.g., alert consolidation platform 102, telemetry information source 103, and user device 104).

In one or more arrangements, alert consolidation platform 102, telemetry information source 103, and user device 104 may be any type of computing device capable of receiving a user interface, receiving input via the user interface, and communicating the received input to one or more other computing devices. For example, alert consolidation platform 102, telemetry information source 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of alert consolidation platform 102, telemetry information source 103, and user device 104 may, in some instances, be special-purpose computing devices configured to perform specific functions.

Referring to FIG. 1B, alert consolidation platform 102 may include one or more processors 111, memory 112, and communication interface 113. A data bus may interconnect processor 111, memory 112, and communication interface 113. Communication interface 113 may be a network interface configured to support communication between alert consolidation platform 102 and one or more networks (e.g., network 101, or the like). Memory 112 may include one or more program modules having instructions that when executed by processor 111 cause alert consolidation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of alert consolidation platform 102 and/or by different computing devices that may form and/or otherwise make up alert consolidation platform 102. For example, memory 112 may have, host, store, and/or include alert consolidation module 112a, alert consolidation database 112b, and machine learning engine 112c. Alert consolidation module 112a may have instructions that direct and/or cause alert consolidation platform 102 to execute advanced optimization techniques to generate, apply, and/or otherwise maintain an image comparison model for use in consolidating system alerts. Alert consolidation database 112b may store information used by alert consolidation module 112a, in executing, generating, applying, and/or otherwise maintaining an image comparison model for use in consolidating system alerts and/or in performing other functions. Machine learning engine 112c may be used to train, deploy, and/or otherwise refine models used to support functionality of the alert consolidation module 112a through both initial training and one or more dynamic feedback loops, which may, e.g., enable continuous improvement of the alert consolidation platform 102 and further optimize the consolidation of system alerts.

Figure 2A:
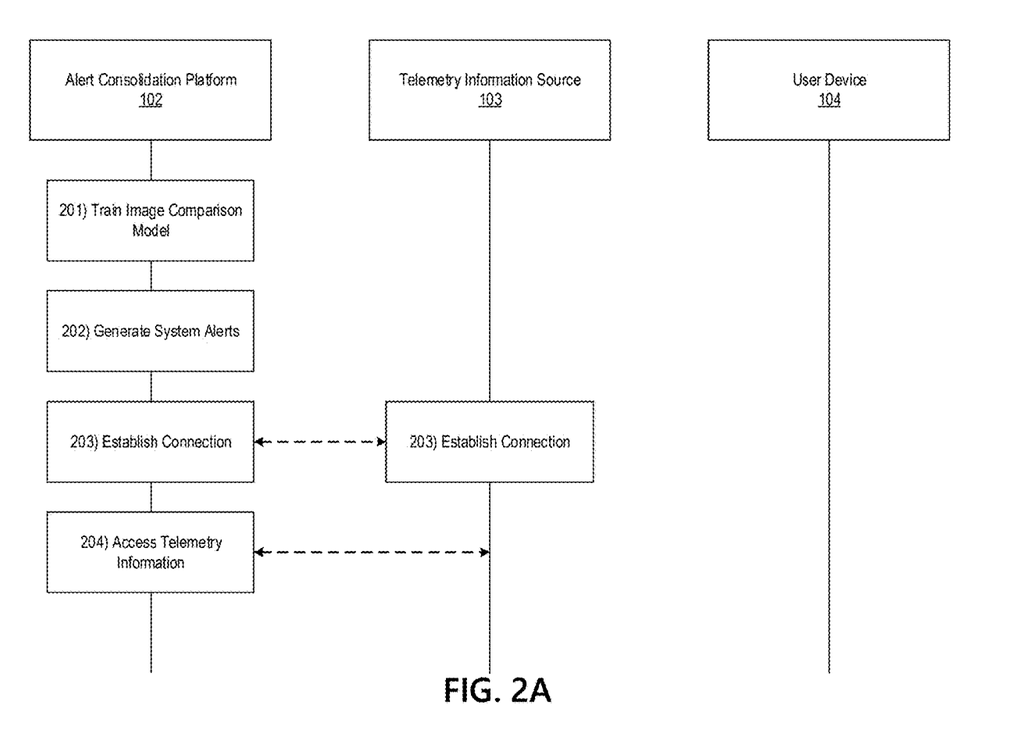
FIGS. 2A-2C depict an illustrative event sequence for consolidating alerts using image matching of heatmap descriptions in accordance with one or more example embodiments.
Figure 2B:
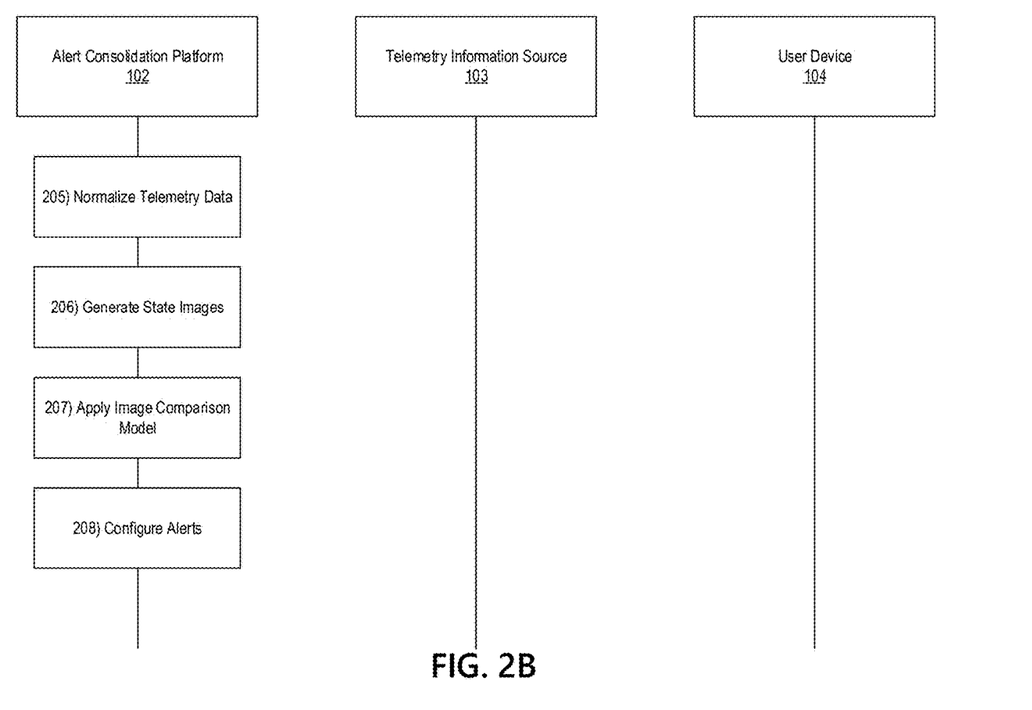
Figure 2C:
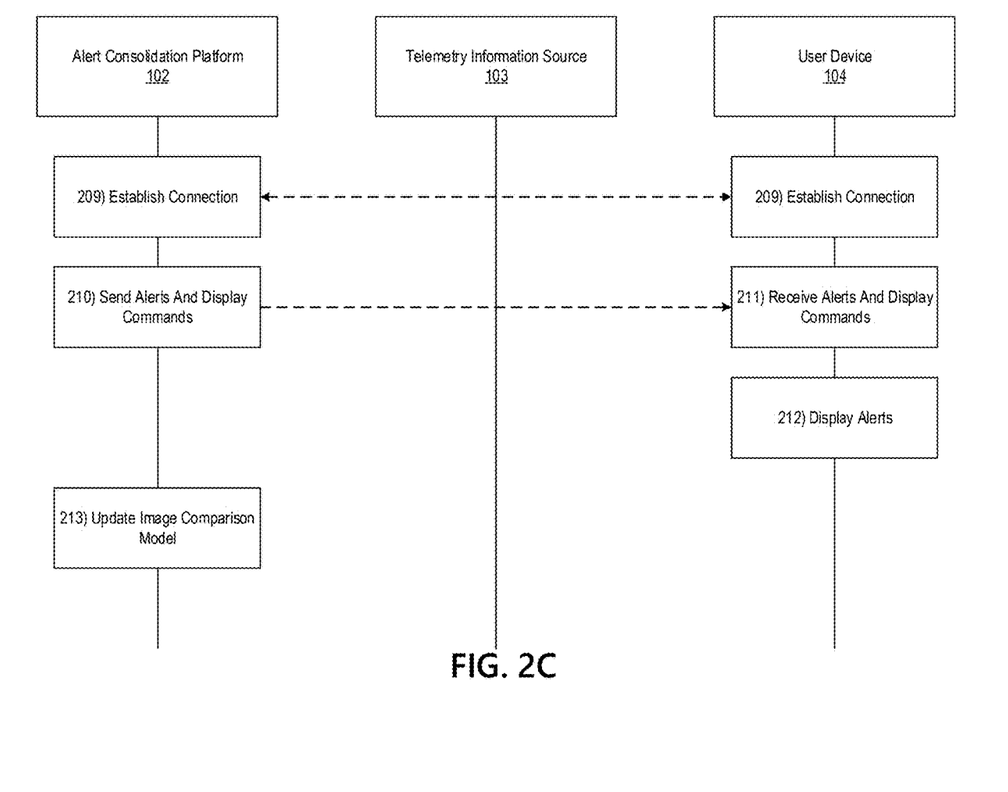
Figure 6:
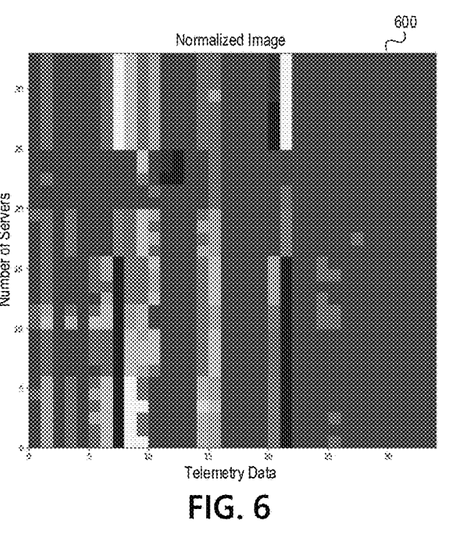
FIGS. 6 and 7 depict illustrative diagrams for consolidating alerts using image matching of heatmap descriptions in accordance with one or more example embodiments.
Figure 7:
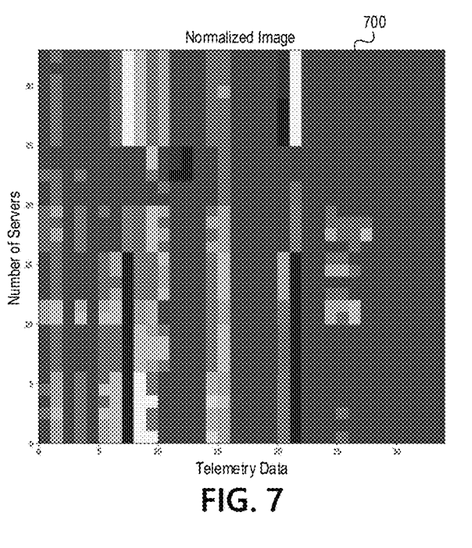

FIGS. 2A-2C depict an illustrative event sequence for consolidating alerts using image matching of heatmap descriptions in accordance with one or more example embodiments. Referring to FIG. 2A, at step 201, the alert consolidation platform 102 may train an image comparison model. For example, the alert consolidation platform 102 may receive historical telemetry data (e.g., from the telemetry information source 103, and/or otherwise). The alert consolidation platform 102 may normalize the historical telemetry data to create normalized telemetry data values between zero and one (e.g., in floating point numbers). Based on the normalized telemetry data, the alert consolidation platform 102 may generate telemetry state images, similar to the normalized images depicted in FIGS. 6 and 7.

In some instances, the alert consolidation platform 102 may use these normalized images to train a CNN, as the image comparison model, to identify matching telemetry state images. For example, by inputting these normalized images into the CNN, the alert consolidation platform 102 may train the CNN to recognize features in telemetry state images that may enable the CNN to perform image matching between such telemetry state images. In some instances, the alert consolidation platform 102 may train the CNN using unsupervised techniques to categorize the historical images. In other instances, the alert consolidation platform 102 may train the CNN using partially supervised techniques to categorize the historical images.

Additionally or alternatively, the alert consolidation platform 102 may train the image classification model to identify matches using a structural property comparison between various features of the thermal images such as image peaks and troughs (e.g., number of peaks and troughs, total areas of peaks and troughs, or the like), center of gravity, moment, spatial frequency, and/or other features.

In some instances, the image classification model may be trained to generate an image matching score. In instances where the CNN is used, the CNN may be trained to identify similarities between the colors and the locations of such colors in the state images. In these instances, the CNN may be trained to identify a degree to which the colors and their given locations between images match (e.g., on a percentage basis, or the like).

In the case of the featureless recognition, the image classification model may be trained to generate an image matching score for each feature described above (e.g., peaks and troughs, moment, center of gravity, spatial frequency, or the like), and then combine the various feature image matching scores to create an overall image matching score. In these instances, the smaller the discrepancy between the above described features of an input image and a previously classified image, the higher the matching score, and vice versa.

In some instances, these features may be weighted evenly (e.g., overall image matching score=(0.25*peaks and troughs score)+ (0.25*center of gravity score)+ (0.25*moment score)+ (0.25*spatial frequency score)). Alternatively, the features may be weighted differently. In some instances, the features may initially be weighted evenly, and the weighting may be dynamically adjusted over time (e.g., via a dynamic feedback loop) to weight features higher that may be identified as higher indicators of matching images.

In some instances, the alert consolidation platform 102 may train the image comparison model to identify non-exact (e.g., fuzzy) matches based on a certain percentage of matching thermal image features (e.g., despite an exact match not being available). For example, the alert consolidation platform 102 may predict the fuzzy match in the event that an exact match is not identified. In some instances, the alert consolidation platform 102 may generate a similarity score between various features of the input thermal images and the historical thermal images. If the similarity score exceeds a predetermined similarity threshold, the alert consolidation platform 102 may identify a fuzzy match. In these instances, if a corresponding match is ultimately identified through a fuzzy match, the alert consolidation platform 102 may train the image comparison model to identify a correlation between the corresponding state images (e.g., by refining the model using a dynamic feedback loop). In doing so, the alert consolidation platform 102 may conserve computing resources by avoiding an extensive alternative evaluation to identify outputs where no exact match is identified.

In some instances, in training the image comparison model, the alert consolidation platform 102 may train a supervised learning model. For example, the alert consolidation platform 102 may train one or more of: decision trees, ensembles (e.g., boosting, bagging, random forest, or the like), neural networks, linear regression models, artificial neural networks, logistic regression models, support vector machines, and/or other supervised learning models. In some instances, the alert consolidation platform 102 may train the image comparison model using one or more unsupervised learning techniques (e.g., classification, regression, clustering, anomaly detection, artificial neutral networks, and/or other supervised models/techniques). Accordingly, the image comparison model may ultimately be trained to identify matching state images based on their similarities.

With further reference to FIG. 2A, at step 202, the alert consolidation platform 102 may generate system alerts for a given system infrastructure being monitored. In some instances, the alerts may correspond to telemetry information from the telemetry information source 103. For example, the alert consolidation platform 102 may generate system alerts indicating a particular process is missing, that memory utilization dropped below or exceeded various thresholds, that CPU thresholds are not met or are exceeded, that processes are not running, and/or other information. In some instances, these alerts may be generated for incidents identified as occurring within a predetermined period of time of each other.

At step 203, the telemetry information source 103 may establish a connection with the alert consolidation platform 102. For example, the telemetry information source 103 may establish a first wireless data connection with the alert consolidation platform 102 to link the telemetry information source 103 to the alert consolidation platform 102 (e.g., in preparation for sending telemetry information). In some instances, the telemetry information source 103 may identify whether or not a connection is already established with the alert consolidation platform 102. If a connection is already established with the alert consolidation platform 102, the telemetry information source 103 might not re-establish the connection. If a connection is not yet established with the alert consolidation platform 102, the telemetry information source 103 may establish the first wireless data connection as described herein.

At step 204, the alert consolidation platform 102 may access telemetry data from the telemetry information source. For example, the telemetry information source 103 may send time stamps, dates, system names, computer processing unit (CPU) information, memory information, and/or other telemetry information corresponding to performance of a plurality of systems (and/or the telemetry information source 103 itself). In some instances, in accessing the telemetry data, the alert consolidation platform 102 may access telemetry data corresponding to the time period during which the alerts/incidents (e.g., described at step 202) were generated and/or otherwise identified. In some instances, the alert consolidation platform 102 may access the telemetry data via the communication interface 113 and while the first wireless data connection is established.

Referring to FIG. 2B, at step 205, the alert consolidation platform 102 may normalize the telemetry data received at step 204. For example, the alert consolidation platform 102 may convert the telemetry data (which may, e.g., include values of different sizes, ranges, or the like) to values between zero and one. In doing so, the alert consolidation platform 102 may configure the telemetry data for representation as telemetry state images.

At step 206, the alert consolidation platform 102 may generate telemetry state images using the normalized telemetry data. For example, the alert consolidation platform 102 may generate images similar to diagram 600 depicted in FIG. 6, the diagram 700 depicted in FIG. 7, or the like. For example, the telemetry state images may include the telemetry data plotted against the various systems corresponding to the telemetry data and at a given time. Specifically, the telemetry state images may represent heatmaps corresponding to a current status of a system or system infrastructure represented by the telemetry data. In essence, the telemetry state images may be snapshot representations of the performance of these systems at various times. For example, the telemetry state images may each represent a state of the system infrastructure at a time corresponding to a particular alert (e.g., the alerts generated at step 202).

In some instances, in generating the telemetry state images, the alert consolidation platform 102 may apply one or more thresholding techniques. As a simple example, the alert consolidation platform 102 may use green to represent any values from 0-3 (inclusive), yellow to represent any values from 3.1-6 (inclusive), and red to represent any values from 6.1-10 (inclusive). Any number of colors and/or threshold ranges may be implemented without departing from the scope of the disclosure.

At step 207, the alert consolidation platform 102 may input the state images, generated at step 206, into the image comparison model to identify whether there are any matches. For example, the alert consolidation platform 102 may compare each state image to the remaining state images generated at step 206.

In some instances, the alert consolidation platform 102 may identify matches between the telemetry state images using the CNN. For example, the alert consolidation platform 102 may input the telemetry state images into the CNN, which may, e.g., identify matches by comparing features of the state images. In some instances, the CNN may identify an exact match. In other instances, the CNN may identify a threshold match (e.g., at least a threshold level match).

In some instances, in identifying matches in the telemetry state images, the CNN may receive images in a spatial domain, and may convert (e.g., using a first Fourier transform or otherwise) the images into the frequency domain. In doing so, the CNN may make translations, rotations, inversions, and/or other features of the images invariant, which may, e.g., increase both a speed and an accuracy at which the CNN may classify the images.

Additionally or alternatively, the image comparison model may compare features (e.g., peaks and troughs, center of gravity, moment spatial frequency, and/or other features) of the state images to each other. If the image comparison model identifies that a similarity or matching score with one or more other state images exceeds a predetermined matching threshold, the image comparison model may identify a match between the corresponding state images.

At step 208, the alert consolidation platform 102 may configure the alerts, generated at step 202, based on any matches identified using the image comparison model. For example, if the alert consolidation platform 102 identified that a first state image (corresponding to a first alert) matches a second state image (corresponding to a second alert), the alert consolidation platform 102 may combine/consolidate the first and second alerts into a single alert. If instead the alert consolidation platform 102 did not identify any matches between state images, the alert consolidation platform 102 may maintain a configuration of the alerts (e.g., maintain separate first and second alerts, or the like).

Referring to FIG. 2C, at step 209, the alert consolidation platform 102 may establish a connection with the user device 104. For example, the alert consolidation platform 102 may establish a second wireless data connection with the user device 104 to link the alert consolidation platform 102 to the user device 104 (e.g., in preparation for sending alerts). In some instances, the alert consolidation platform 102 may identify whether or not a connection is already established with the user device 104. If a connection is already established with the user device 104, the alert consolidation platform 102 might not re-establish the connection. If a connection is not yet established with the user device 104, the alert consolidation platform 102 may establish the second wireless data connection as described herein.

At step 210, the alert consolidation platform 102 may send the system alert(s) to the user device 104. For example, the alert consolidation platform 102 may send the system alerts to the user device 104 via the communication interface and while the second wireless data connection is established. In some instances, the alert consolidation platform 102 may also send one or more commands directing the user device 104 to display the system alerts.

At step 211, the user device 104 may receive the system alert(s) sent at step 210. For example, the user device 104 may receive the system alerts while the second wireless data connection is established. In some instances, the user device 104 may also receive the one or more commands directing the user device 104 to display the system alerts.

Figure 4:
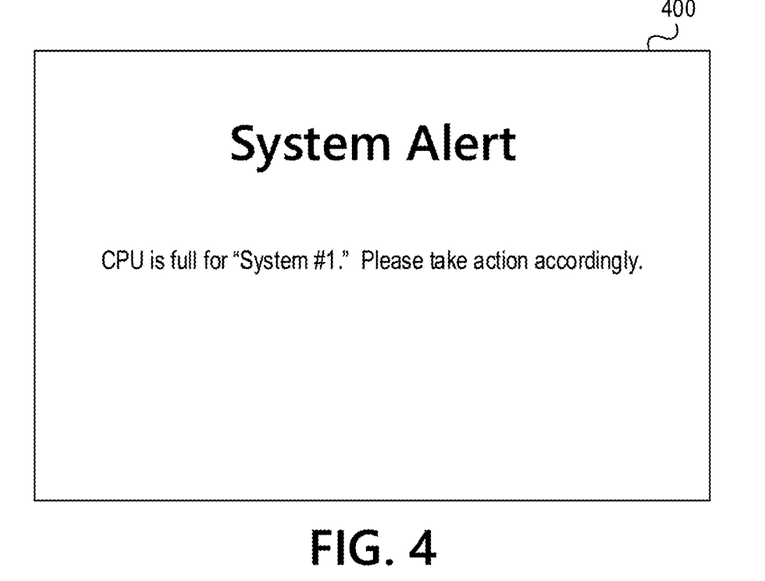
FIGS. 4 and 5 depict illustrative user interfaces for consolidating alerts using image matching of heatmap descriptions in accordance with one or more example embodiments.
Figure 5:
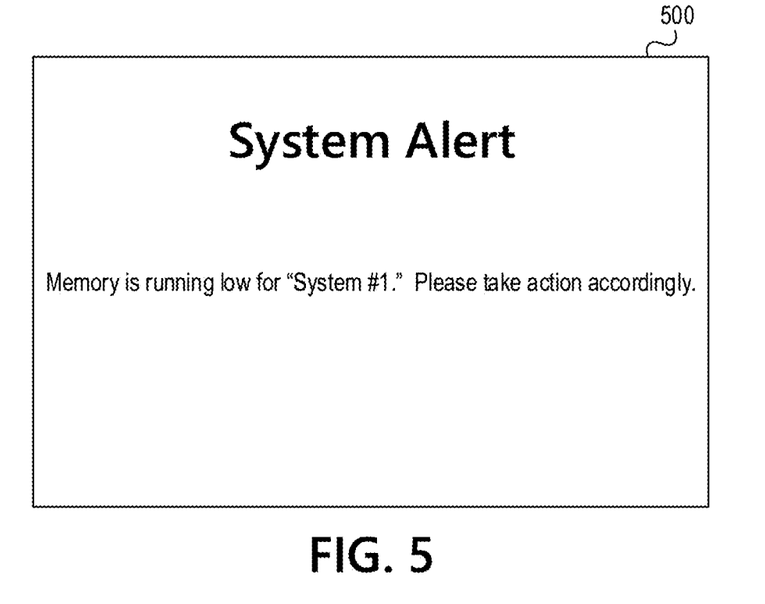

At step 212, based on or in response to the one or more commands received at step 211, the user device 104 may display the system alerts. For example, the user device 104 may display a graphical user interface similar to graphical user interface 400, shown in FIG. 4, graphical user interface 500, shown in FIG. 5, or the like.

In addition or as an alternative to sending the system alerts and display commands, the alert consolidation platform 102 may send one or more alert resolution commands, which may, for example, direct the user device 104, telemetry information source 103, and/or other systems (such as a network gateway, packet routing system, load balancer, or the like) to automatically execute one or more actions to address the given alerts (which may, e.g., cause these systems to execute the one or more alert resolution actions accordingly). In some instances, such commands may be consolidated as described above with regard to the alerts. For example, if two alerts have been consolidated, the alert consolidation platform 102 may send a single alert resolution command corresponding to the consolidated alert. In contrast, if the two alerts have not been consolidated, the alert consolidation platform 102 may send alert resolution commands corresponding to each alert. In some instances, the alert resolution commands may cause requests to be directed away from a particular system, update processes, and/or otherwise address issues flagged by the alerts. In doing so, processing resources may be conserved by avoiding the duplicate performance of particular actions.

At step 213, the alert consolidation platform 102 may update the image comparison model. For example, the alert consolidation platform 102 may update the image comparison model based on the telemetry state images and the comparison results. In doing so, the alert consolidation platform 102 may continue to refine the image comparison model using a dynamic feedback loop, which may, e.g., increase the accuracy and effectiveness of the model in performing image matching and alert consolidation.

In some instances, the alert consolidation platform 102 may continuously refine the image comparison model. In some instances, the alert consolidation platform 102 may maintain an accuracy threshold for the image comparison model, and may pause refinement (through the dynamic feedback loops) of the model if the corresponding accuracy is identified as greater than the corresponding accuracy threshold. Similarly, if the accuracy fails to be equal or less than the given accuracy threshold, the alert consolidation platform 102 may resume refinement of the model through the corresponding dynamic feedback loop.

Although the analysis of system telemetry data is primarily described, the methods described above may be used to analyze other types of information (e.g., application performance information, or the like) without departing from the scope of the disclosure.

Figure 3:
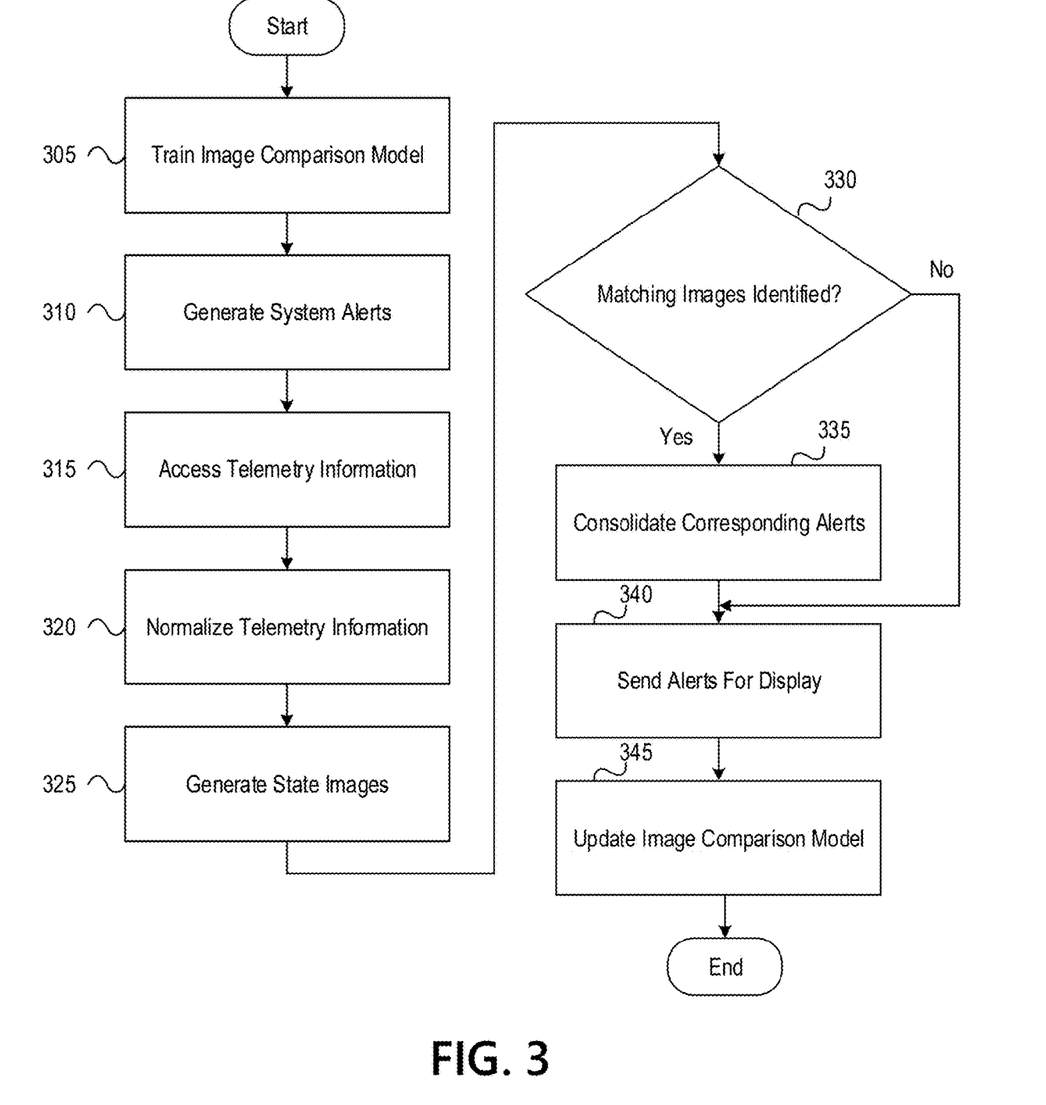
FIG. 3 depicts an illustrative method for consolidating alerts using image matching of heatmap descriptions in accordance with one or more example embodiments.

FIG. 3 depicts an illustrative method for consolidating alerts using image matching of heatmap descriptions in accordance with one or more example embodiments. Referring to FIG. 3, at step 305, a computing platform comprising one or more processors, memory, and a communication interface may train an image comparison model. At step 310, the computing platform may generate system alerts for a system infrastructure. At step 315, the computing platform may access telemetry information corresponding to the system alerts. At step 320, the computing platform may normalize the telemetry information. At step 325, the computing platform may generate state images using the telemetry information. At step 330, the computing platform may identify whether or not any matching images are identified.

If no matching images are identified, the computing platform may proceed to step 340. Otherwise, if matching images are identified, the computing platform may proceed to step 335. At step 335, the computing platform may consolidate the corresponding alerts. At step 340, the computing platform may send the alerts to a user device for display. At step 345, the computing platform may update the image comparison model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        train, using historical telemetry state images, an image comparison model to identify matches between telemetry state images;
        generate, for a system, a plurality of system alerts corresponding to a period of time;
        access telemetry data corresponding to the period of time;
        generate, based on the telemetry data and for a time corresponding to each of the plurality of system alerts, a telemetry state image to produce a plurality of telemetry state images;
        input, into the image comparison model, the plurality of telemetry state images to identify whether or not any of the plurality of telemetry state images match; and
        based on detecting a match:
            consolidate system alerts corresponding to the matching telemetry state images, wherein consolidating the system alerts corresponding to the matching telemetry state images produces a single system alert representative of the system alerts corresponding to the matching telemetry state images, and
            send, to a user device, the single system alert and one or more commands directing the user device to display the single system alert, wherein sending the one or more commands directing the user device to display the single system alert causes the user device to display the single system alert.

2. The computing platform of claim 1, wherein training the image comparison model comprises training the image comparison model to perform a structural property comparison between telemetry state images to identify whether or not there is a match between the telemetry state images.

3. The computing platform of claim 1, wherein training the image comparison model comprises training the image comparison model to perform pattern matching using a convolutional neural network (CNN) to identify whether or not there is a match between the telemetry state images.

4. The computing platform of claim 1, wherein identifying whether or not any of the plurality of telemetry state images match comprises:
    identifying a matching score between at least two of the telemetry state images;
    comparing the matching score to a matching threshold;
    based on identifying that the matching score meets or exceeds the matching threshold, identifying that the at least two of the telemetry state images match; and
    based on identifying that the matching score does not meet or exceed the matching threshold, identifying that the at least two of the telemetry state images do not match.

5. The computing platform of claim 1, wherein the memory stores additional computer readable instructions that, when executed by the at least one processor, cause the computing platform to:
    based on failing to detect the match, send, to the user device, the plurality of system alerts and one or more commands directing the user device to display the plurality of system alerts, wherein sending the one or more commands directing the user device to display the plurality of system alerts causes the user device to display the plurality of system alerts.

6. The computing platform of claim 1, wherein the memory stores additional computer readable instructions that, when executed by the at least one processor, cause the computing platform to:
    update, based on identifying whether or not any of the plurality of telemetry state images match, the image comparison model.

7. The computing platform of claim 1, wherein the memory stores additional computer readable instructions that, when executed by the at least one processor, cause the computing platform to:
    based on detecting the match:
        send a single alert resolution command directing a network system to execute one or more alert resolution actions to address a system issue noted in the single system alert.

8. The computing platform of claim 1, wherein the memory stores additional computer readable instructions that, when executed by the at least one processor, cause the computing platform to:
    based on failing to detect the match, send a plurality of alert resolution commands directing a network system to execute one or more alert resolution actions to address system issues noted in each of the plurality of system alerts.

9. The computing platform of claim 1, wherein the memory stores additional computer readable instructions that, when executed by the at least one processor, cause the computing platform to:
    normalize the telemetry data, wherein generating the plurality of telemetry state images comprises generating, using the normalized telemetry data, the plurality of telemetry state images.

10. A method comprising:
    at a computing platform comprising at least one processor, a communication interface, and memory:
        training, using historical telemetry state images, an image comparison model to identify matches between telemetry state images;
        generating, for a system, a plurality of system alerts corresponding to a period of time;
        accessing telemetry data corresponding to the period of time;
        generating, based on the telemetry data and for a time corresponding to each of the plurality of system alerts, a telemetry state image to produce a plurality of telemetry state images;
        inputting, into the image comparison model, the plurality of telemetry state images to identify whether or not any of the plurality of telemetry state images match; and
        based on detecting a match:
            consolidating system alerts corresponding to the matching telemetry state images, wherein consolidating the system alerts corresponding to the matching telemetry state images produces a single system alert representative of the system alerts corresponding to the matching telemetry state images, and sending, to a user device, the single system alert and one or more commands directing the user device to display the single system alert, wherein sending the one or more commands directing the user device to display the single system alert causes the user device to display the single system alert.

11. The method of claim 10, wherein training the image comparison model comprises training the image comparison model to perform a structural property comparison between telemetry state images to identify whether or not there is a match between the telemetry state images.

12. The method of claim 10, wherein training the image comparison model comprises training the image comparison model to perform pattern matching using a convolutional neural network (CNN) to identify whether or not there is a match between the telemetry state images.

13. The method of claim 10, wherein identifying whether or not any of the plurality of telemetry state images match comprises:

identifying a matching score between at least two of the telemetry state images;

comparing the matching score to a matching threshold;

based on identifying that the matching score meets or exceeds the matching threshold, identifying that the at least two of the telemetry state images match; and based on identifying that the matching score does not meet or exceed the matching threshold, identifying that the at least two of the telemetry state images do not match.

14. The method of claim 10, further comprising:

based on failing to detect the match, sending, to the user device, the plurality of system alerts and one or more commands directing the user device to display the plurality of system alerts, wherein sending the one or more commands directing the user device to display the plurality of system alerts causes the user device to display the plurality of system alerts.

15. The method of claim 10, further comprising:

updating, based on identifying whether or not any of the plurality of telemetry state images match, the image comparison model.

16. The method of claim 10, further comprising:

based on detecting the match:

sending a single alert resolution command directing a network system to execute one or more alert resolution actions to address a system issue noted in the single system alert.

17. The method of claim 10, further comprising:

based on failing to detect the match, sending a plurality of alert resolution commands directing a network system to execute one or more alert resolution actions to address system issues noted in each of the plurality of system alerts.

18. The method of claim 10, further comprising:

normalize the telemetry data, wherein generating the plurality of telemetry state images comprises generating, using the normalized telemetry data, the plurality of telemetry state images.

19. One or more non-transitory computer-readable media storing instructions that, when executed by a computing platform comprising at least one processor, a communication interface, and memory, cause the computing platform to:

train, using historical telemetry state images, an image comparison model to identify matches between telemetry state images;

generate, for a system, a plurality of system alerts corresponding to a period of time;

access telemetry data corresponding to the period of time;

generate, based on the telemetry data and for a time corresponding to each of the plurality of system alerts, a telemetry state image to produce a plurality of telemetry state images;

input, into the image comparison model, the plurality of telemetry state images to identify whether or not any of the plurality of telemetry state images match; and based on detecting a match:

consolidate system alerts corresponding to the matching telemetry state images, wherein consolidating the system alerts corresponding to the matching telemetry state images produces a single system alert representative of the system alerts corresponding to the matching telemetry state images, and send, to a user device, the single system alert and one or more commands directing the user device to display the single system alert, wherein sending the one or more commands directing the user device to display the single system alert causes the user device to display the single system alert.

20. The one or more non-transitory computer-readable media of claim 19, wherein training the image comparison model comprises training the image comparison model to perform a structural property comparison between telemetry state images to identify whether or not there is a match between the telemetry state images.

* * * * *